Feb. 23, 1954 J. A. CUNNINGHAM 2,670,240
COATING SHOE
Filed Nov. 16, 1951
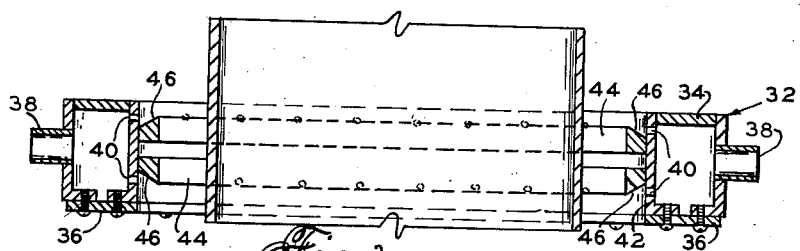
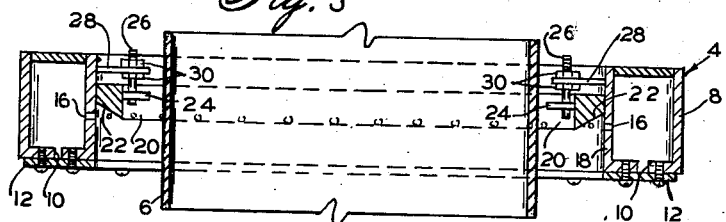
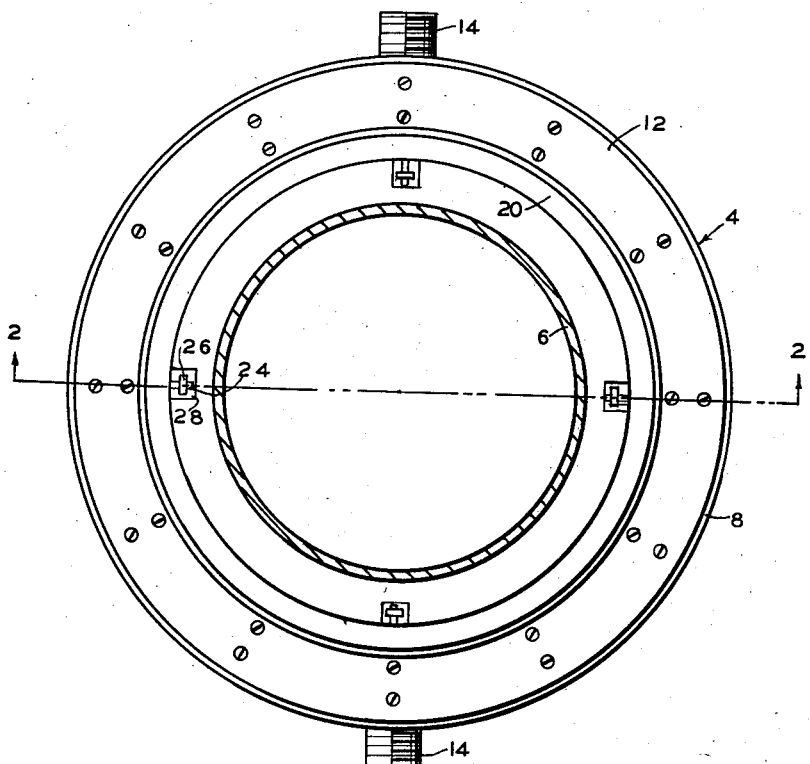
INVENTOR.
J. A. CUNNINGHAM
BY
C. M. McKnight
ATTORNEY Patented Feb. 23, 1954

2,670,240

UNITED STATES PATENT OFFICE 2,670,240

COATING SHOE

Joseph A. Cunningham, Tulsa, Okla., assignor to Perrault Bros., Tulsa, Okla., a corporation of Delaware Application November 16, 1951, Serial No. 256,795

3 Claims. (Cl. 299—128)

This invention relates to improvements in coating shoes of the type used on pipe line coating machines.

One of the most popular types of coating shoes used in the industry is an annular shaped shoe adapted to loosely surround the pipe being coated. A plurality of circumferentially spaced apertures are provided in the inner periphery of the shoe to spray the coating material onto the pipe in a series of relatively closely spaced streams around the entire circumference of the pipe. Each stream of the coating material is directed toward the pipe in substantially a radial direction. The tendency of the coating material to spread upon contact with the pipe is relied upon to provide a layer of the coating material on the pipe between the adjacent streams.

It will be apparent that when a particular coating shoe is used on a pipe slightly larger than contemplated, the streams of coating material will be spaced further apart upon contact with the pipe than contemplated. In such a situation the coating material will not spread sufficiently between the adjacent streams to completely coat the pipe. The resulting voids provide vulnerable points for corrosion of the pipe. In addition, a change in the temperature or consistency of the coating material will affect the spreading qualities of the material and hence the efficiency of the coating shoe. Furthermore, pits or recesses in the outer surface of a pipe are frequently not completely covered by such an intermittent application of the coating material. The inefficiency of this type of shoe is partially overcome by applying an excessive amount of coating material onto the pipe. However, this results in a substantial amount of waste, since the excessive coating material usually runs off the pipe and is lost.

The present invention contemplates an improvement of spray type coating shoes by providing an annular splash ring around the inner periphery of such a shoe. The splash ring is so constructed and arranged to join the various streams of coating material emitting from the shoe into a single stream and provide a continuous curtain of coating material for application on the pipe. A continuous coat or layer of coating material is thereby assuredly applied on the pipe, and a coating shoe of a given diameter may be utilized on various sizes of pipes. Furthermore, the quantity of the coating material used may be more closely controlled.

An important object of this invention is to provide an improved spray type coating shoe so constructed and arranged to emit a continuous annular curtain of coating material.

Another object of this invention is to provide an improved coating shoe capable of being used on various sizes of pipes.

Another object of this invention is to reduce the loss of coating material when using a spray type coating shoe.

A further object of this invention is to improve the efficiency of spray type coating shoes.

A still further object of this invention is to provide an improved spray type coating shoe which may be economically manufactured.

Other objects and advantages of the invention will be evident from the following detailed description, read in conjunction with the accompanying drawings, which illustrate my invention.

In the drawings:

Figure 1 is an end elevational view of a coating shoe shown disposed around a pipe.

Figure 2 is a cross sectional view taken along lines 2—2 of Fig. 1.

Figure 3 is a cross sectional view, similar to Fig. 2, of a modified coating shoe.

Referring to the drawings in detail, and particularly to Fig. 1, reference character 4 generally designates an annular shaped coating shoe surrounding a pipe 6. It will be understood that the coating shoe 4 is supported (not shown) by a suitable pipeline coating machine (not shown). The coating shoe 4 comprises an annular housing 8 substantially square shaped in cross section as is more clearly shown in Fig. 2. One side 10 of the housing 8 may be cut away and provided with a suitable inspection plate 12 to facilitate cleaning of the shoe 4 if desired. The housing 8 may be a unitary structure as shown or may be divided into segments (not shown) to facilitate the positioning thereof around the pipe 6 in a manner well known in the art. A pair of couplings 14 are secured at diametrically opposite points on the housing 8 to provide inlets for coating material or dope to the shoe 4. Usually, a single row of apertures 16 are provided in the inner periphery, or plate 18, of the housing 8 in circumferentially spaced relationship. The apertures 16 are preferably radially disposed with respect to the pipe 6 and provide outlets for the coating material or dope from the shoe 4.

A novel ring 20, sometimes hereinafter called a "splash ring," is disposed on the inner periphery of the housing 8. The outer diameter of the splash ring 20 is preferably of a size to provide a tight frictional fit of the ring 20 in the plate 18 to permit adjustment of the ring 20. However, the splash ring 20 may be secured to the housing 8 in any suitable manner such as by welding (not shown) if desired. One side face 22 of the splash ring 20 is beveled outwardly from the outer diameter of the ring toward the inner diameter thereof for purposes as will be hereinafter set forth. The splash ring 20 is positioned within the inner plate 18 of the housing 8 in such a manner that the beveled face 22 overlies the apertures 16.

A plurality of studs 24 are provided in circumferentially spaced relationship on the inner periphery of the splash ring 20 to receive adjusting eye bolts 26. The eye bolts 26 extend through complementary apertured brackets 28 secured on the inner plate 18 of the housing 8 and are secured thereto by nuts 30 to provide for longitudinal adjustment of the splash ring 20 in the housing 8 in an obvious manner.

OPERATION

In operation of the coating shoe 4, hot coating material is supplied to the housing 8 through the couplings 14 in a manner well known in the art. From the housing 8, the coating material is sprayed through the apertures 16 onto the beveled face 22 of the splash ring 20. It will be apparent that the splash ring 20 will cause the adjacent streams of coating material being emitted through the apertures 16 to spread and join upon contact with the face 22. In this manner the coating material takes the form of a single stream continuous around the entire circumference of the splash ring 20 when flowing from the splash ring 20 inwardly toward the pipe 6. The form of the flowing coating material between the splash ring 20 and the pipe 6 may be described as a continuous curtain or sheet to contrast the type of flow with a plurality of individual streams such as would occur in the absence of the splash ring 20.

The position of the splash ring 20 with respect to the apertures 16 may be readily adjusted through the medium of the bolts 26, nuts 30 and brackets 28 in an easy and convenient manner. It will be apparent that when the coating shoe 4 is moved axially over the pipe 6, in either direction, a continuous coat or layer of the coating material will be applied on the outer surface of the pipe 6.

A modified coating shoe generally indicated at 32 is illustrated in Fig. 3, and comprises an annular housing 34 having an inspection plate 36 secured to one side thereof. Couplings 38 are provided at diametrically opposite points on the housing 34 and provide inlets for coating material to the housing 34 in the usual manner.

Two rows of circumferentially spaced apertures 40 are provided in the inner plate 42 of the housing 34 to provide discharge ports for coating material in the housing 34. The apertures 40 are preferably drilled or formed to extend radially in the same manner as the apertures 16 in the shoe 4.

A splash ring 44 is disposed on the inner periphery of the housing 34 adjacent each row of apertures 40. The outer diameter of each splash ring 44 is preferably of a size to provide a tight frictional fit of each ring 44 with the inner plate 42 of the housing 34 to permit adjustment of the rings 44. However, the rings 44 may be welded (not shown) or otherwise suitably secured to the plate 42 if desired. One side face 46 of each ring 44 is beveled outwardly from the outer diameter of the ring toward the inner diameter thereof. The rings 44 are arranged in the shoe 2 in such a manner that the beveled side face 46 of each ring 44 is adjacent to and overlies one row of the apertures 40. In this manner, the streams of coating material discharging from the apertures 40 will contact the respective beveled face 46 and spread in the same manner as previously described.

The purpose of two rows of apertures 40 is, of course, to increase the rate of discharge of coating material from the shoe 32 without the loss of the advantages of a spray type coating shoe. One of the rings 44 may be dispensed with entirely, or shortened to extend only partially around the inner circumference of the shoe 32, if the particular coating material being utilized will spread on a pipe sufficiently without the use of both of the splash rings 44.

From the foregoing it is apparent that the present invention provides an improved spray type coating shoe adapted to discharge a single stream, or continuous curtain, of coating material inwardly toward a pipe. By combining the various streams of coating material as the coating material discharges from the shoe, a coating shoe of a given size may be used on various sizes of pipes with equal efficiency. Furthermore, the amount of coating material may be more closely controlled due to the fact that an excessive amount of coating material need not be applied on the pipe to obtain an uninterrupted coat. It will also be apparent that the present coating shoe may be economically manufactured.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A coating shoe for applying coating material on a pipe, comprising an annular housing of a size to loosely surround the pipe and having inlets for coating material, a plurality of circumferentially spaced discharge apertures in the inner periphery of the housing, said discharge apertures being radially disposed to direct coating material discharging therethrough in a radial direction toward the pipe, and an annular splash ring contacting the inner periphery of the housing adjacent the discharge apertures, the side face of said ring adjacent the discharge apertures being beveled outwardly from the outer diameter of the ring toward the inner diameter thereof and arranged to overlie the discharge apertures, whereby the coating material discharging through said apertures will contact said beveled face and spread for flow in a continuous curtain toward the pipe.

2. A coating shoe for applying coating material on a pipe, comprising an annular housing of a size to loosely surround the pipe and having inlets for coating material, two rows of radially disposed circumferentially spaced discharge apertures in the inner periphery of the housing, and an annular splash ring secured on the inner periphery of the housing adjacent each row of discharge apertures, the side face of each splash ring adjacent the respective row of discharge apertures being beveled and arranged to receive coating material discharging through said apertures, whereby the coating material will be spread during discharge thereof from the shoe.

3. A pipe line coating shoe for a traveling pipe line coating machine, comprising an annular housing of a size to loosely surround the pipe and having inlets for coating material, a plurality of circumferentially spaced discharge apertures in the inner periphery of the housing, said discharge apertures being radially disposed to direct coating material discharging therethrough in a radial direction toward the pipe, and a splash ring contacting the complete inner periphery of the housing adjacent the discharge apertures, the side face of said ring adjacent the discharge apertures being beveled outwardly from the outer diameter of the ring toward the inner diameter thereof and arranged to overlie the discharge apertures, whereby the coating material discharging through said apertures will contact said beveled face and spread for flow in a continuous curtain toward the pipe.

JOSEPH A. CUNNINGHAM.

References Cited in the file of this patent

UNITED STATES PATENTS

| Number | Name | Date |
|---|---|---|
| Re. 13,366 | Bowers | Feb. 6, 1912 |
| 963,354 | Braemer | July 5, 1910 |
| 2,288,316 | Focha | June 30, 1942 |
| 2,340,325 | Horrigan | Feb. 1, 1944 |
| 2,478,357 | Bagley et al. | Aug. 9, 1949 |
| 2,509,238 | Martin | May 30, 1950 |